US011015938B2

(12) United States Patent
Narendra et al.

(10) Patent No.: US 11,015,938 B2
(45) Date of Patent: May 25, 2021

(54) METHOD, SYSTEM AND APPARATUS FOR NAVIGATIONAL ASSISTANCE

(71) Applicant: Zebra Technologies Corporation, Lincolnshire, IL (US)

(72) Inventors: Patrenahalli M. Narendra, Hoffman Estates, IL (US); Joseph R. White, Glenwood, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/217,296

(22) Filed: Dec. 12, 2018

(65) Prior Publication Data

US 2020/0191575 A1    Jun. 18, 2020

(51) Int. Cl.
*H04W 24/00* (2009.01)
*G01C 21/20* (2006.01)
(Continued)

(52) U.S. Cl.
CPC ......... *G01C 21/206* (2013.01); *G01C 21/005* (2013.01); *G01S 11/06* (2013.01);
(Continued)

(58) Field of Classification Search
CPC ......... G01S 17/06; G01S 5/163; G01S 17/48; G01S 2013/466; G01S 2013/468;
(Continued)

(56) References Cited

U.S. PATENT DOCUMENTS

| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |
| 5,534,762 A | 7/1996 | Kim |

(Continued)

FOREIGN PATENT DOCUMENTS

| CA | 2835830 | 11/2012 |
| CA | 3028156 | 1/2018 |
| CN | 104200086 | 12/2014 |
| CN | 107067382 | 8/2017 |
| EP | 766098 | 4/1997 |

(Continued)

OTHER PUBLICATIONS

International Search Report and Written Opinion for corresponding International Patent Application No. PCT/US2016/064110 dated Mar. 20, 2017.

(Continued)

*Primary Examiner* — Joseph Arevalo

(57) ABSTRACT

An assistive navigational system for deployment in a facility having a global frame of reference includes: a server including a memory storing: a plurality of anchor definitions each containing (i) an anchor position in the global frame of reference, and (ii) a feature set corresponding to physical characteristics of the facility at the anchor position; and a task definition containing (i) a task position defined relative to the anchor position, and (ii) task overlay data; the server further including a communications interface, and a processor configured to: select one of the anchor definitions for association with the task definition; and transmit the selected anchor definition and the task definition to a mobile computing device, the mobile computing device configured to receive the selected anchor definition and the task definition; the mobile computing device further configured to present the task overlay data on a display.

16 Claims, 10 Drawing Sheets

(51) Int. Cl.
  *G01C 21/00* (2006.01)
  *G01S 11/08* (2006.01)
  *H04B 17/318* (2015.01)
  *G01S 11/06* (2006.01)
  *H04W 64/00* (2009.01)

(52) U.S. Cl.
  CPC ............ *G01S 11/08* (2013.01); *H04B 17/318* (2015.01); *H04W 64/003* (2013.01)

(58) Field of Classification Search
  CPC .... G01S 7/481; G05D 1/0234; G05D 1/0061; G05D 1/0212; G05D 1/0223; G05D 1/0231; G05D 1/0272; G05D 1/0274; G05D 1/028; G05D 2201/0203; G05D 2201/0207; G05D 2201/0213; H04N 7/18; H04N 7/188
  USPC .......................... 455/456.3, 456.1, 457, 562.1
  See application file for complete search history.

(56) References Cited

U.S. PATENT DOCUMENTS

| | | |
|---|---|---|
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,037,396 B2 | 5/2015 | Pack et al. |
| 9,064,394 B1* | 6/2015 | Trundle ............ G08B 13/19684 |
| 9,070,285 B1 | 6/2015 | Ramu et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |

(56) References Cited

U.S. PATENT DOCUMENTS

| | | |
|---|---|---|
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1* | 9/2005 | DiBernardo ............ G01S 5/163 356/139.03 |
| 2005/0213109 A1* | 9/2005 | Schell .................... G01S 5/163 356/614 |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0168382 A1 | 7/2007 | Tillberg et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1* | 1/2013 | Miller .................... G01C 21/16 701/500 |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1* | 5/2013 | Gutmann ............. G05D 1/0231 700/253 |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1* | 6/2014 | Cullinane ............. B60W 30/00 701/23 |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |

(56) References Cited

U.S. PATENT DOCUMENTS

| | | |
|---|---|---|
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1* | 5/2016 | Itoko ............... G06Q 10/06398 705/7.42 |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1* | 1/2017 | Sun ............... G06F 11/00 |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0087663 A1 | 3/2019 | Yamazaki et al. |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | |
|---|---|---|
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

International Search Report and Written Opinion for corresponding International Patent Application No. PCT/US2017/024847 dated Jul. 7, 2017.

International Search Report and Written Opinion for International Application No. PCT/US2019/025859 dated Jul. 3, 2019.

(56) References Cited

OTHER PUBLICATIONS

International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", The international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-.
Perveen et al. (An overview of template matching methodologies and its application, International Journal of Research in Computer and Communication Technology, v2n10, oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: Piks Inside, New York: John Wily & Sons, US, pp. 243-258, 551.
Puwein, J., et al."Robust Multi-view camera calibration for wide-baseline camera networks,"In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).

(56) References Cited

OTHER PUBLICATIONS

Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
"Fair Billing with Automatic Dimensioning" pp. 1-4, undated, Copyright Mettler-Toledo International Inc.
"Plane Detection in Point Cloud Data" dated Jan. 25, 2015 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., "A comparison of geometric and energy-based point cloud semantic segmentation methods," European Conference on Mobile Robots (ECMR), pp. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
International Search Report and Written Opinion from International Patent Application No. PCT/US2019/050370 dated Nov. 19, 2019.
International Search Report and Written Opinion from International Patent Application No. PCT/US2019/064020 dated Feb. 19, 2020.
International Search Report and Written Opinion from International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion for International Application No. PCT/US2019/025870 dated Jun. 21, 2019.
Kim, et al. "Robust approach to reconstructing transparent objects using a time-of-flight depth camera", Optics Express, vol. 25, No. 3; Published Feb. 6, 2017.
United Kingdom Intellectual Property Office, Combined Search and Examination Report dated May 13, 2020 for GB Patent Application No. 1917864.9.

\* cited by examiner

METHOD, SYSTEM AND APPARATUS FOR NAVIGATIONAL ASSISTANCE

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

Tasks may be identified for execution within such environments, for example to correct price labels on products, restock a supply of products, and the like. Such tasks may be assigned to human operators for execution. The presence of a variable number of tasks, as well as a variable number of mobile operators, within the environment at any given time can lead to inefficient allocation of tasks to operators, resulting in underutilization or overutilization of certain operators or the need for expensive training of multiple operators on multiple tasks.

Further, the operator assigned to perform a given task may be required to accurately locate a position within the facility at which the task is to be performed. A mobile computing device carried by the operator may have insufficiently accurate localization to guide the operator to the correct position within the facility, resulting in incorrectly executed tasks, delays in task execution, or both.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
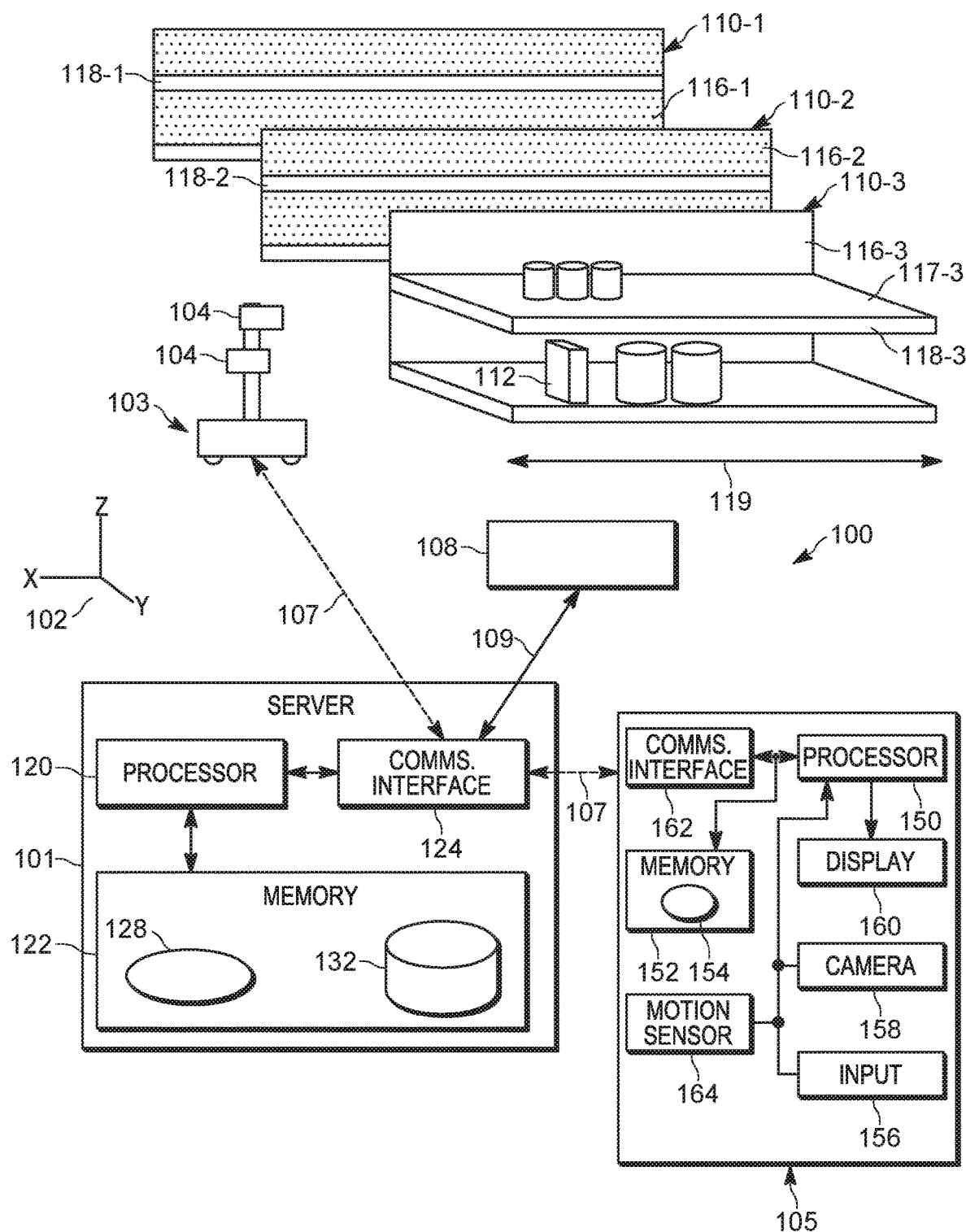
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of navigational assistance at a mobile computing device for deployment in a facility having a global frame of reference, the method comprising: receiving an anchor definition containing (i) an anchor position in the global frame of reference, and (ii) a feature set corresponding to physical characteristics of the facility at the anchor position; receiving a task definition containing (i) a task position defined relative to the anchor position, and (ii) task overlay data; capturing, using an image capture module, a sequence of images; responsive to detecting the feature set in the sequence of images, determining a local device position of the mobile computing device relative to the anchor position; based on the local device position and the task position, determining whether the task position is within a field of view of the mobile computing device; and responsive to determining that the task position is within the field of view, presenting the sequence of images overlaid with the overlay data on a display.

Additional examples disclosed herein are directed to a mobile computing device for navigational assistance in a facility having a global frame of reference, the mobile computing device comprising: a memory storing: an anchor definition containing (i) an anchor position in the global frame of reference, and (ii) a feature set corresponding to physical characteristics of the facility at the anchor position; and a task definition containing (i) a task position defined relative to the anchor position, and (ii) task overlay data; a display; an image capture module configured to capture a sequence of images; a processor connected to the memory, the display and the image capture module, the processor configured to: responsive to detecting the feature set in the sequence of images, determine a local device position of the mobile computing device relative to the anchor position; based on the local device position and the task position, determine whether the task position is within a field of view of the mobile computing device; and responsive to determining that the task position is within the field of view, control the display to present the sequence of images overlaid with the overlay data on a display.

Further examples disclosed herein are directed to an assistive navigational system for deployment in a facility having a global frame of reference, the system comprising: a server including a memory storing: a plurality of anchor definitions each containing (i) an anchor position in the global frame of reference, and (ii) a feature set corresponding to physical characteristics of the facility at the anchor position; and a task definition containing (i) a task position defined relative to the anchor position, and (ii) task overlay data; the server further including a communications interface, and a processor configured to: select one of the anchor definitions for association with the task definition; and transmit the selected anchor definition and the task definition to a mobile computing device, the mobile computing device configured to receive the selected anchor definition and the task definition; the mobile computing device further configured to present the task overlay data on a display.

FIG. 1 depicts a mobile automation and navigational system 100 in accordance with the teachings of this disclosure. The system 100 is illustrated as being deployed in a retail environment, but in other embodiments can be deployed in a variety of other environments, including warehouses, manufacturing facilities, hospitals, and the like. The above-noted environments are referred to herein generically as facilities. The system 100 includes a server 101 in communication with at least one mobile automation apparatus 103 (also referred to herein simply as the apparatus 103) and at least one client computing device 105 (also referred to herein as a mobile computing device 105) via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of mobile computing device, such as a laptop computer, a desktop computer mounted on a mobile cart, a dedicated vehicle computer (as in a forklift), smart glasses, a virtual-reality headset, or the like. The system 100 can include a plurality of client devices 105 in communication with the server 101 via respective links 107.

The system 100 is deployed, in the illustrated example, in a retail facility including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail facility, and communicates with the server 101 (e.g. via the link 107) to navigate, autonomously or partially autonomously, along a length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing, e.g. to detect objects such as shelved products in the captured data, and detect status information corresponding to the objects.

The server 101 may also be configured to transmit status notifications (e.g. notifications indicating that products are out-of-stock, low stock or misplaced) to the client device 105 responsive to the determination of product status data. The status notifications, as will be discussed in greater detail below, are provided to the client device 105 in the form of task definitions, indicating what tasks are to be performed (e.g. by a human operator of the client device 105) to correct the status of one or more objects. The server 101 is further configured to provide to the client device 105, along with the above-noted task definitions, navigational information that the client device 105 is configured to process to guide the operator to the appropriate location within the facility for execution of the task (e.g. to correct a price label, relocate is misplaced product, and the like). Navigational information can include positions within the facility defined according to a global frame of reference 102 (e.g. a coordinate system).

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing task and navigational data to the client device 105. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to generating or otherwise obtaining task definitions and navigational information for provision to the client device 105 to guide an operator of the client device 105 to the appropriate location within the facility to perform one or more tasks, as noted above. The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) configured for navigational computations) rather than by execution of the control application 128 by the processor 120.

The client device 105 includes a special-purpose controller, such as a processor 150, interconnected with a non-transitory computer readable storage medium, such as a memory 152. The memory 152 includes a combination of volatile (e.g. Random Access Memory or RAM) and non-volatile memory (e.g. read only memory or ROM, Electrically Erasable Programmable Read Only Memory or EEPROM, flash memory). The processor 150 and the memory 152 each comprise one or more integrated circuits.

The client device 105 also includes at least one input device 156 interconnected with the processor 150. The input device 156 is configured to receive input and provide data representative of the received input to the processor 150. The input device 156 includes any one of, or a suitable combination of, a touch screen, a keypad, a trigger button, a microphone, and the like. In addition, the client device 105 includes a camera 158 including a suitable image sensor or combination of image sensors. The camera 158 is configured to capture images (e.g. single frames or video streams including sequences of image frames) for provision to the processor 150.

The client device 105 also includes a display 160 (e.g. a flat-panel display integrated with the above-mentioned touch screen) interconnected with the processor 150, and configured to render data under the control of the processor 150. The client device 105 can also include one or more output devices in addition to the display 160, such as a speaker, a notification LED, and the like (not shown).

The client device 105 also includes a communications interface 162 interconnected with the processor 150. The communications interface 162 includes any suitable hardware (e.g. transmitters, receivers, network interface controllers and the like) allowing the client device 105 to communicate with other computing devices via wired and/or wireless links (e.g. over local or wide-area networks). The specific components of the communications interface 162 are selected based on the type(s) of network(s) or other links that the client device 105 is required to communicate over.

Further, the client device 105 includes a motion sensor 164, such as an inertial measurement unit (IMU) including one or more accelerometers, one or more gyroscopes, and/or one or more magnetometers. The motion sensor 164 is configured to generate data indicating detected movement of the client device 105 and provide the data to the processor 150, for example to enable the processor 150 to maintain one or more localizations of the client device 105 (i.e. with respect to the frame of reference 102 or a local frame of reference, as will be discussed in greater detail below).

The memory 152 stores computer readable instructions for execution by the processor 150. In particular, the memory 152 stores a navigational assistance application 154 (also referred to simply as the application 154) which, when executed by the processor 150, configures the processor 150 to perform various functions discussed below in greater detail and related to the receipt and presentation of task and navigational information. The application 150 may also be implemented as a suite of distinct applications in other examples.

The processor 150, when so configured by the execution of the application 154, may also be referred to as a navigational assistance controller 150. Those skilled in the art will appreciate that the functionality implemented by the processor 150 via the execution of the application 154 may also be implemented by one or more specially designed hardware and firmware components, such as FPGAs, ASICs and the like in other embodiments.

Figure 2A:
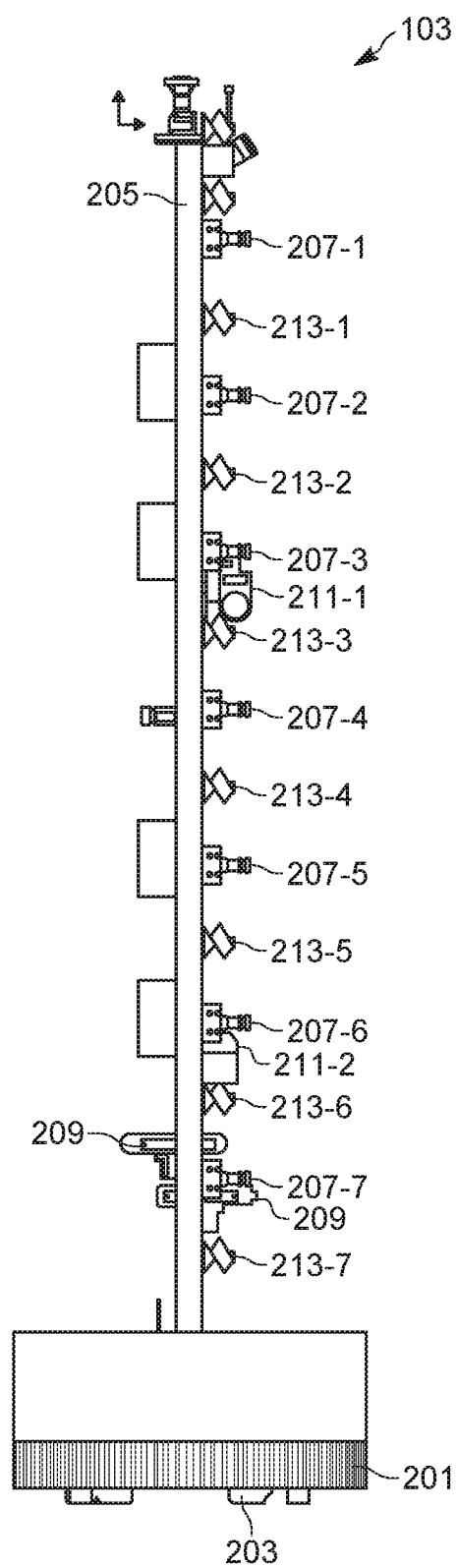
FIG. 2A depicts a mobile automation apparatus in the system of FIG. 1.
Figure 2B:
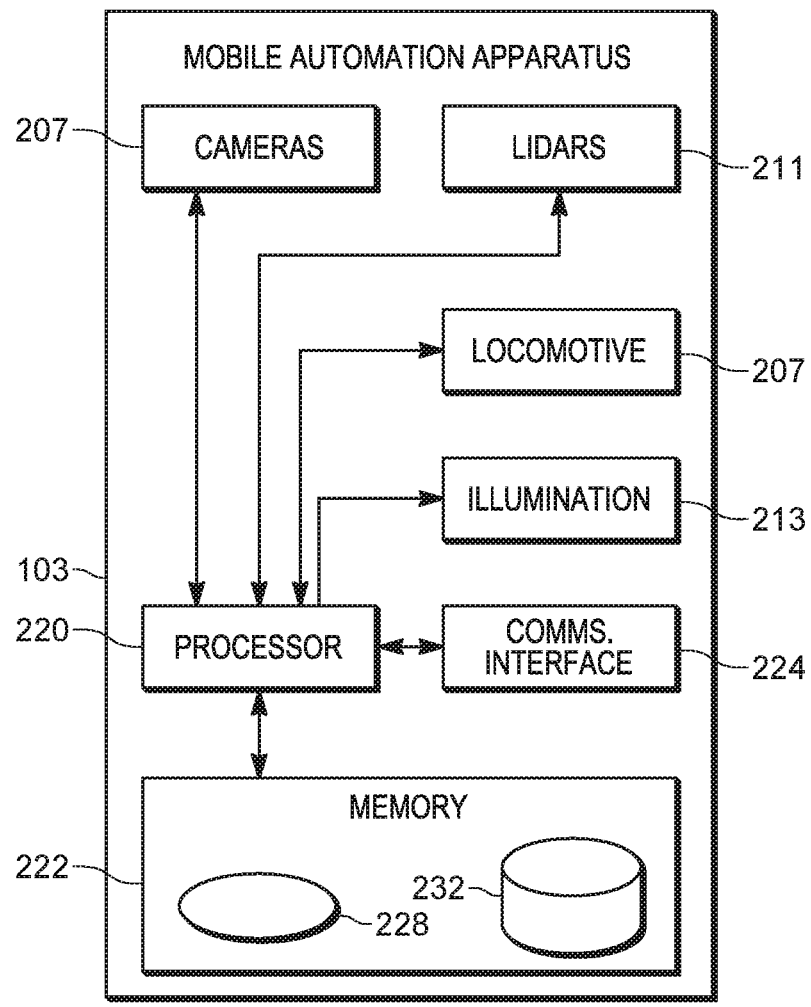
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in the global frame of reference 102 previously established in the retail facility, permitting data captured by the mobile automation apparatus 103 to be registered to the common frame of reference. The above-mentioned location of the apparatus 103 within the frame of reference 102, also referred to as localization, is employed in the generation of paths for execution by the apparatus 103.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, one or more maps of the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

The functionality of the applications 128 and 154 will now be described in greater detail. In particular, the generation of task and navigational information for deployment to the client device 105 from the server 101, as well as the processing of the above-mentioned information at the client device 105, will be described.

Figure 3:
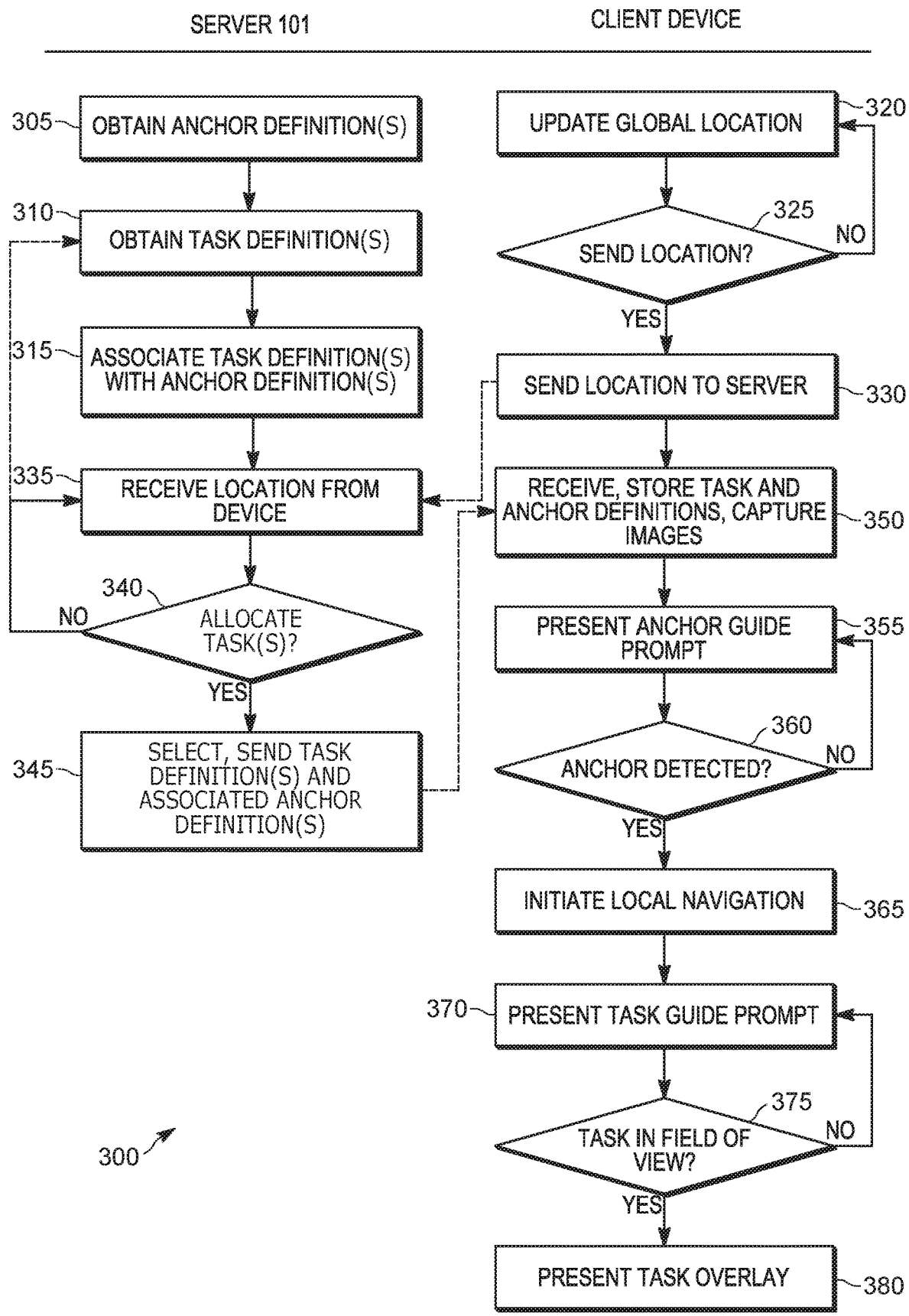
FIG. 3 is a flowchart of a method of generating and deploying navigational assistance information in the system of FIG. 1.

Turning to FIG. 3, a method 300 of generating and deploying navigational assistance information is shown. As illustrated in FIG. 3, certain blocks of the method 300 are performed by the server 101, while other blocks of the method 300 are performed by the client device 105. In other embodiments, the server 101 can be configured to perform certain blocks shown in FIG. 3 as being performed by the client device 105. In still other embodiments, the client device 105 can be configured to perform certain blocks shown in FIG. 3 as being performed by the server 101.

At block 305, the server 101 is configured to obtain one or more anchor definitions, for storage in the memory 122 (e.g. in the repository 132). Anchor definitions can be obtained at the server 101 during the initial deployment of the system 100 in the facility. In general, an anchor definition includes data defining a position within the facility. The position, in the present discussion, corresponds to a location according to the global frame of reference 102, as well as an orientation (e.g. yaw, pitch and roll angles at the above-mentioned location). Each anchor definition also includes a feature set corresponding to physical characteristics of the facility at the above-mentioned position. In other words, an anchor definition defines various characteristics of the facility when observed from the anchor position. As will be discussed below, the use of an anchor definition therefore permits other computing devices, including the client device 105, to detect at least a portion of the feature set contained in the anchor definition. The client device 105 can thereby determine a current position of the client device 105 both globally (i.e. according to the frame of reference 102) and locally, with respect to the anchor position.

Anchor definitions may be obtained in a variety of ways at block 305. In some examples, each anchor definition is generated by a mobile data capture device, such as a client device 105 or the apparatus 103. In particular, the mobile data capture device is placed (manually or via autonomous or semi-autonomous navigation) at a known position according to the frame of reference 102. The known position corresponds to the anchor position mentioned above. The mobile data capture device is then configured to capture data from the anchor position. The nature of the data captured is not particularly limited. In the present example, the data captured includes image data depicting physical structures within the facility surrounding the anchor position. That is, the mobile data capture device includes an image sensor configured to capture one or more image frames from the selected anchor position. The data captured for use in generating an anchor definition can also include depth scan data, for example acquired via lidar or depth camera. In further examples, the captured data can include proximity indicators such as wireless access point signatures (e.g. one or more received signal strength indicators (RSSI) and round trip times (RTT) for each of a plurality of access points detected from the anchor position), and/or beacon signatures (e.g. one or more identifiers of beacons detectable from the anchor position, such as Bluetooth low energy (BLE) beacon identifiers, visual light communication (VLC) emitter identifiers, and the like).

Following data capture as described above, a feature set is extracted from the captured data, for storage (along with the anchor position) as the anchor definition. A wide variety of features may be extracted to generate the feature set. In the case of captured image data, features can include any suitable combination of geometric constructs such as lines, planes and polygons, extracted via the execution of suitable edge and plane detection operations (e.g. random sample consensus (RANSAC), Sobel filters, and the like). Features extracted from image data can also include color and/or brightness histograms. Feature extraction may be performed at the capture device mentioned above, or at the server 101 upon receipt of the captured data from the capture device. Following data capture and feature extraction, the feature set is stored along with the global anchor position as an anchor definition in the memory 122 (e.g. in the repository 132).

Figure 4A:
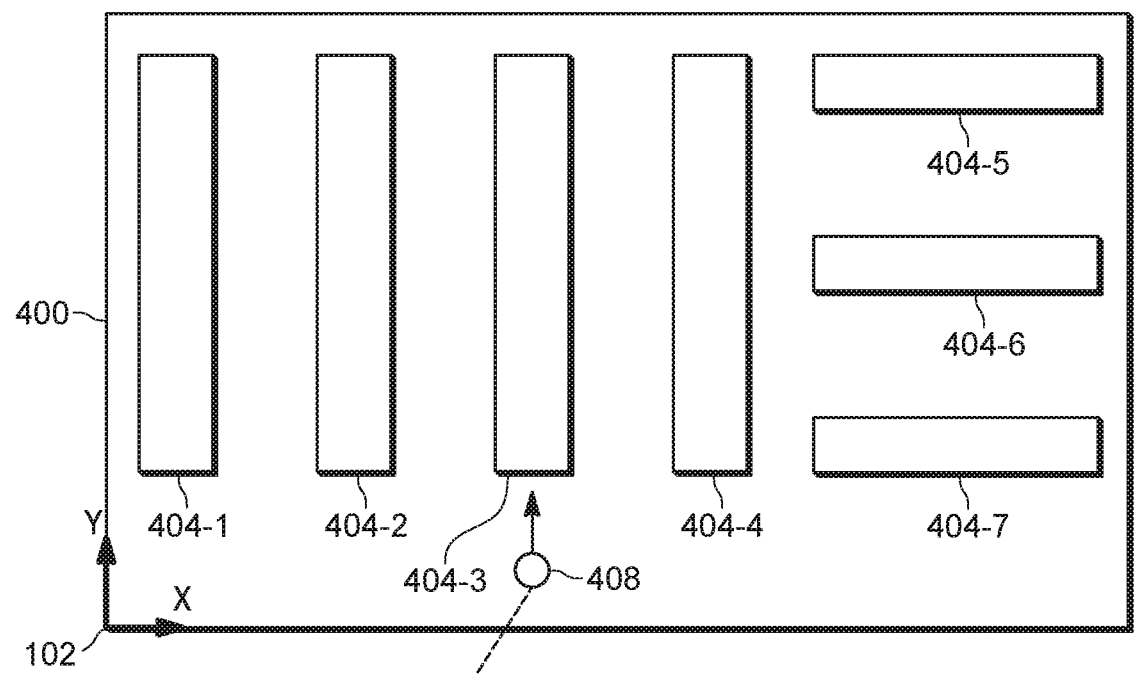
FIG. 4A is an overhead view of a facility illustrating an anchor position.
Figure 4B:
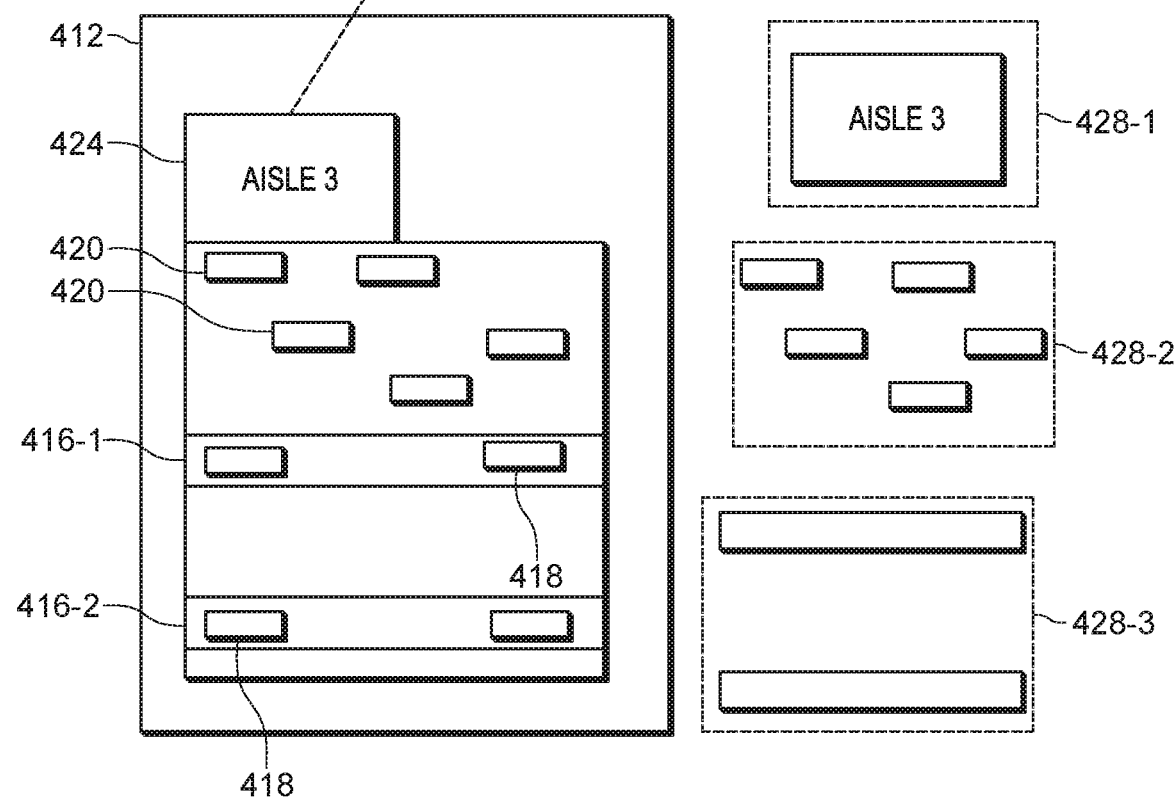
FIG. 4B depicts an anchor feature set employed in the method of FIG. 3.

FIGS. 4A and 4B illustrate the generation of an example anchor definition. In particular, FIG. 4A illustrates an overhead view of a facility 400 such as a retail facility containing a plurality of rows 404-1, 404-2, 404-3, 404-4, 404-5, 404-6 and 404-7 of shelf modules forming aisles. As seen in FIG. 4A, each row 404 occupies a region of the facility 400, which can be expressed as a set of coordinates in the global frame of reference 102. An anchor position 408 is also shown in FIG. 4A, defined by a location (e.g. the center of the circular element of the anchor position 408) and an orientation (e.g. the direction indicated by the arrow of the anchor position 408).

FIG. 4B illustrates image data 412 captured by a mobile data capture device (e.g. the apparatus 103 or the client device 105) during the creation of the anchor definition. In particular, the image data 412 includes an image frame captured from the anchor position 408, and depicting an aisle endcap. The endcap includes shelves 416-1 and 416-2 bearing labels 418, as well as a pegboard region bearing labels 420 (e.g. mounted on the end of pegs for supporting products). In addition, the endcap includes an aisle identifier, such as a sign 424 mounted atop the endcap.

The data capture device, or the server 101, are configured to extract features from the image data 412. In the present example, a feature set including three features 428-1, 428-2 and 428-3 is extracted from the image data 412 for storage as an anchor definition (along with the anchor position 408). As illustrated in FIG. 4A, the feature 428-1 includes the edges of the aisle identifier sign 424, as well as a text string defining the aisle identifier itself. The feature 428-1 defines the relative positions and dimensions of the edges and text string. The feature 428-2 includes edges, defined by their dimensions and relative positions, of the labels 420 supported on the pegboard mentioned above. The features 482-3, meanwhile, includes the edges of the shelves 416-1 and 416-2, defined by their dimensions and relative positions. The feature set may also store the relative positions of the features 428 relative to each other (e.g. a position of the center of the feature 428-1 relative to the center of the feature 428-3).

In a further example, an anchor definition can be generated by capturing one or more images as shown in FIG. 4B at the device 105. The device 105 can be further configured to detect a first plane definition corresponding to a floor of the facility, and a second plane definition (also referred to as a shelf plane) based on one or both of the labels 420 and the shelf edges 416. As will now be apparent, the floor plane and the shelf plane detected as discussed above are substantially orthogonal to each other. In addition, the device 105 can be configured to capture and decode an indicium such as a barcode from at least one of the labels 420. The location of the label 420 from which the barcode was captured, relative to the floor plane and the shelf plane, can be provided to the server, where a global location for the barcode is stored (e.g. in a planogram). Thus, a global anchor position is assigned to the anchor based on the predefined barcode location, and the anchor definition includes the definitions of the floor and shelf planes relative to the barcode location. A mobile device (e.g. the device 105, the apparatus 103 or the like) is therefore able to determine its current global location and orientation by detecting the planes and capturing the barcode.

A wide variety of other features may also be extracted from data captured along with the image data 412. As noted above, such features can include a list of access point RSSI and/or RTT values, a list of beacon identifiers, and the like.

The above process can be repeated for any desired number of anchor definitions. In facilities including rows of shelves, such as the rows 404 shown in FIG. 4A, the server 101 can be provided with at least one anchor definition per row 404. For example, two anchor definitions may be created for each row 404, each corresponding to one of the two endcaps of the row 404. In other examples, smaller or greater numbers of anchor definitions may be generated for provision to the server 101. In general, greater numbers of anchor definitions may improve the accuracy of the assistive navigational functions carried out by the server 101 and the client device 105 as described below, at the cost of increased data storage requirements and computational load. Conversely, smaller numbers of anchor definitions may reduce computational burden on the server 101 and/or the client device 105, while potentially reducing the accuracy of the assistive navigational functions.

Returning to FIG. 3, at block 310 the server 101 is configured to obtain one or more task definitions. Task definitions contain data defining tasks to be performed within the facility, for example to correct or otherwise update the above-mentioned status information determined by the server 101 with respect to products or other objects in the facility. The task definitions may therefore be obtained at block 310 by generating the task definitions at the server 101 itself. In other examples, one or more task definitions may be received at the server 101 at block 310, for example from the client device 105. For instance, an operator of the client device 105 may manipulate the client device 105 to transmit product status information to the server 101 (e.g. indicating that a product in a specified location is out of stock and requires a restocking task to be performed).

Each task definition includes a task position and task overlay data (which may also be referred to as task content). The task overlay data, as will be discussed in greater detail below, is subsequently presented at the client device 105 to assist an operator of the client device 105 in performing the corresponding task. The task overlay data may therefore include a product identifier, a task identifier (e.g. a text string indicating what action or sequence of actions is to be performed with respect to the product identifier), and the like. The task position defines a location within the facility at which the task indicated by the task overlay data is to be performed. In the present example, the server 101 is configured to generate task definitions with global task positions, defining the location of the task according to the global frame of reference 102. As will be seen below, however, the task definitions are subsequently updated to include local task positions, defining the position of the task relative to an anchor position (e.g. the anchor position 408).

Figure 5A:
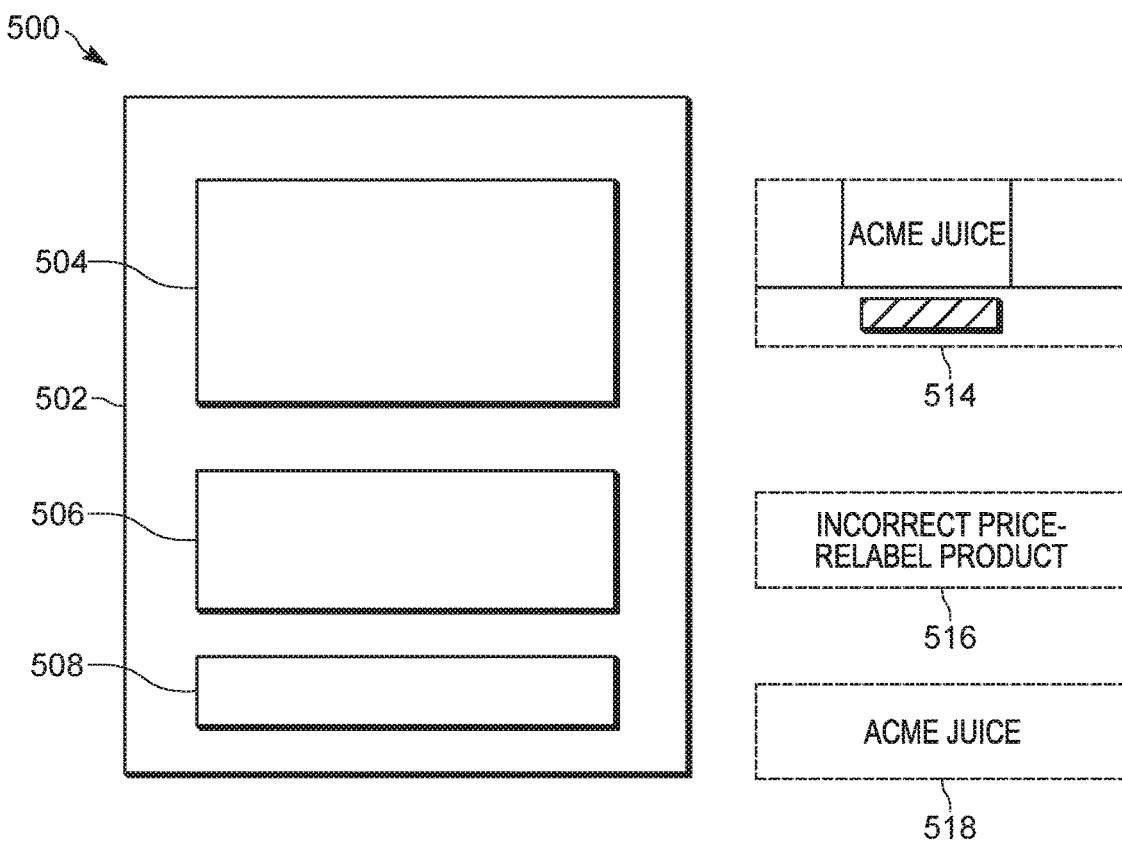
FIG. 5A depicts task overlay data employed in the method of FIG. 3.

Turning to FIG. 5A, example task overlay data 500 is shown for a task generated by the server 101 at block 310 responsive to detecting an incorrect price label in the facility 400 (e.g. from data captured by the mobile automation apparatus 103). The task overlay data 500 includes an overlay template 502 having fields 504, 506 and 508. The template 502 can be employed for each task definition generated by the server 101. In other examples, however, the task overlay data 500 need not be based on such a shared template.

The task overlay data 500 also includes content corresponding to the fields 504, 506 and 508. In particular, the task overlay data 500 includes an image 514 depicting a portion of a shelf at which the task is to be performed. The task overlay data 500 also includes a task descriptor, which in the illustrated example indicates that an incorrect price label has been detected (e.g. as highlighted in the image 514) and must be replaced. Further, the task overlay data 500 includes a product identifier 518, such as a name, a stock-keeping unit (SKU) identifier, or the like. The image 514, task descriptor 516 and product identifier 518 are configured for rendering within the fields 504, 506 and 508 respectively at the client device 105, as will be discussed below. The task definition can include various other overlay data in other examples, including instructions (e.g. text, audio, video, or multimedia) for performing the task.

Figure 5B:
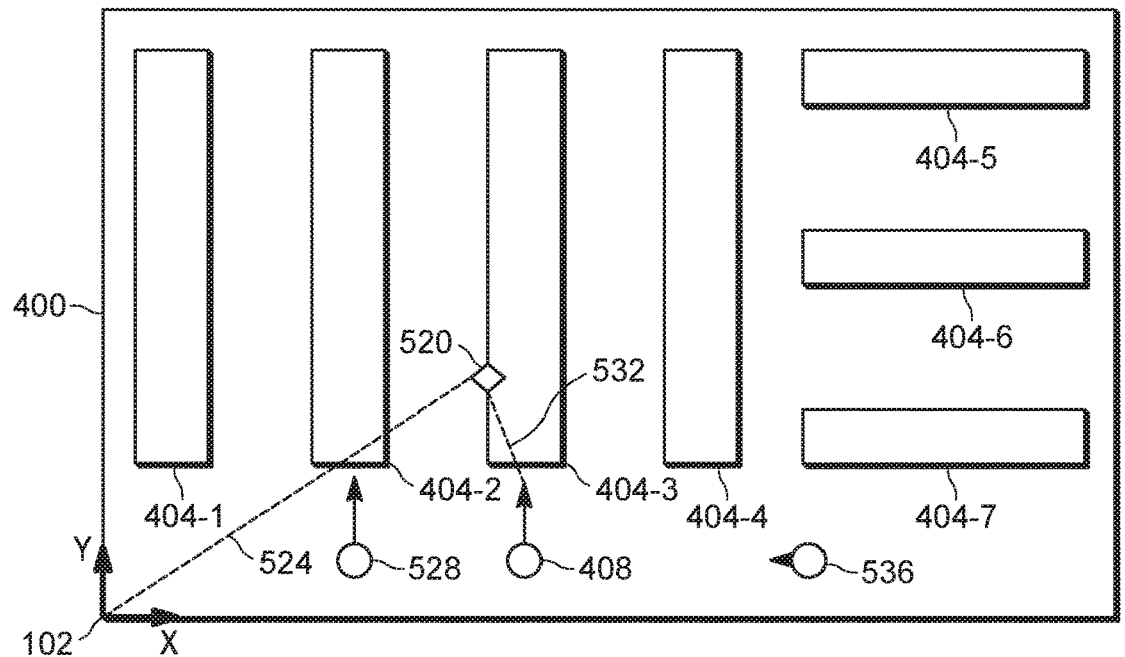
FIG. 5B depicts a further overhead view of the facility of FIG. 4A, illustrating anchor and device positions.

Turning to FIG. 5B, a task 520 defined by the overlay data 500 is shown within the facility 400. The server 101 is configured to generate a task position according to the frame of reference 102 at block 310, as indicated by the dashed line 524 (e.g. represented by a set of coordinates in the frame of reference 102). The server 101 is also configured, however, to store a local task position in the task definition, which indicates the position of the task relative to an anchor position rather than to the frame of reference 102.

Returning to FIG. 3, at block 315 the server 101 is configured to associate each task definition obtained at block 310 with at least one of the anchor definitions obtained at block 305. The server 101 is configured, based on the global position of the task definition (e.g. the position 524 of the task 520 shown in FIG. 5B), to select one of the anchor definitions. Having selected the anchor definition, the server 101 is configured to determine a local task position of the task relative to the anchor position, based on the global positions of the task and the selected anchor definition.

Referring again to FIG. 5B, a second anchor position 528 is shown, corresponding to an endcap of the row 404 adjacent to the endcap corresponding to the anchor position 408. At block 315, the server 101 is configured to select one of the anchor positions 408 and 528 (more specifically, one of the anchor definitions containing the anchor positions 408 and 528). For example, the server 101 can be configured to select the anchor definition having the anchor position closest to the global position of the task 520. In other examples, the server 101 can be configured to apply one or more additional criteria to the anchor selection at block 315. For example, when the facility 400 contains rows 404 of shelves, as does the illustrated example, the server 101 can be configured to select only from anchors associated with the row on which the task 520 is located. In the illustrated example, the server 101 selects the anchor definition containing the anchor position 408 for association with the task 520. The server 101 then determines the local task position 532, defining the position of the task 520 relative to the anchor position 408 rather than relative to the frame of reference 102. The task definition is updated with the local task position 532 (the global task position may be retained in the task definition, but can also be discarded) and an identifier of the corresponding anchor definition. In other examples, a task may be associated with more than one anchor definition. For example, if anchor definitions corresponding to both endcaps of the rows 404 are obtained at block 305, any task generated along a given row 404 may be associated with both corresponding anchor definitions. That is, the task definition may be updated with two local task positions and anchor definition identifiers.

Referring again to FIG. 3, at block 320 the client device 105 is configured to update a global location of the client device 105. The global location of the client device 105, in the frame of reference 102, can be updated according to any of a variety of suitable localization mechanisms. For example, the client device 105 can be configured to provide motion data from the motion sensor 164 as an input to a Kalman filter or other suitable localization algorithm. The client device 105 can also be configured, in some examples, to employ proximity data such as RSSI values and/or RTT values detected in association with wireless access points, beacons or the like, to update the global location at block 320. Updating the location of the device 105 can also be performed by detection of an anchor, if the device 105 has previously been provided with one or more anchor definitions.

At block 325, the client device 105 is configured to determine whether to report the global location from block 320 to the server 101. For example, the client device 105 may be configured to report its global location to the server 101 periodically (e.g. every ten seconds) and the determination at block 325 can be a determination as to whether the configured period has elapsed since the previous location report to the server 101. When the determination at block 325 is negative, the client device 105 continues updating the global location at block 320.

When the determination at block 325 is affirmative, the client device 105 sends its current global location (i.e. in the frame of reference 102) to the server 101 at block 330. The client device 105 typically continues to update the global location and periodically report the global location in parallel with the remainder of the method 300.

At block 335, the server 101 is configured to receive the global location of the client device 105. At block 340, the server 101 is configured to determine whether to allocate one or more tasks to the client device 105. In the present example the determination at block 340 is based on the global location of the client device 105. Specifically, the server 101 is configured to allocate a task to the client device 105 based on proximity between the current (i.e. most recently reported) location of the client device 105 and the global position of the task. In examples in which the global task position is not retained following the performance of block 315, the server 101 is configured to allocate tasks to client devices 105 based on proximity between client device 105 location and anchor position (both in the frame of reference 102).

In other examples, the determination at block 340 can be based on other factors in addition to the location of the client device 105, and in certain examples the determination at block 340 is independent of the location of the client device 105. For example, the server 101 can be configured to allocate tasks to client devices 105 based on whether or not each client device 105 has been allocated a task, regardless of the location of the client device 105.

Other examples of criteria assessed by the server 101 at block 340 includes capabilities of the client device 105 or an associated operator (e.g. identified via login credentials provided at the input device 156). For example, the server 101 can maintain a list of client devices 105 and associated input and output capabilities, such as an indication of whether a client device 105 includes a label printer suitable for completing a price label correction task. Thus, the task descriptor and the client device capabilities, in addition to or instead of client device location, can be assessed by the server 101 at block 340.

When the determination at block 340 is negative, the server 101 is configured to await further location reports from the client device 105, and may also obtain additional task definitions (e.g. in response to further data collection activities by the mobile automation apparatus 103). When the determination at block 340 is affirmative, however, at block 345 the server 101 is configured to select at least one of the task definitions obtained at block 310 according to any of the criteria noted above, and to send both the task definition and the associated anchor definition (i.e. the anchor definition associated with the task definition at block 315) to the client device 105. Thus, at block 345 the server 101 is configured to transmit at least one task definition, containing the task overlay data and local task position, as well as the anchor definition according to which the local task position is defined, to the client device 105.

At block 350, the client device 105 is configured to receive and store the task and anchor definitions in the memory 152. The client device 105 is also configured to initiate an assistive navigational process at block 350. In the present example, the client device 105 is configured to capture a sequence of images using the camera 158 responsive to receiving the task and anchor definitions. The sequence of images are employed by the client device 105 to detect the feature set corresponding to the anchor definition received at block 350.

Figure 6:
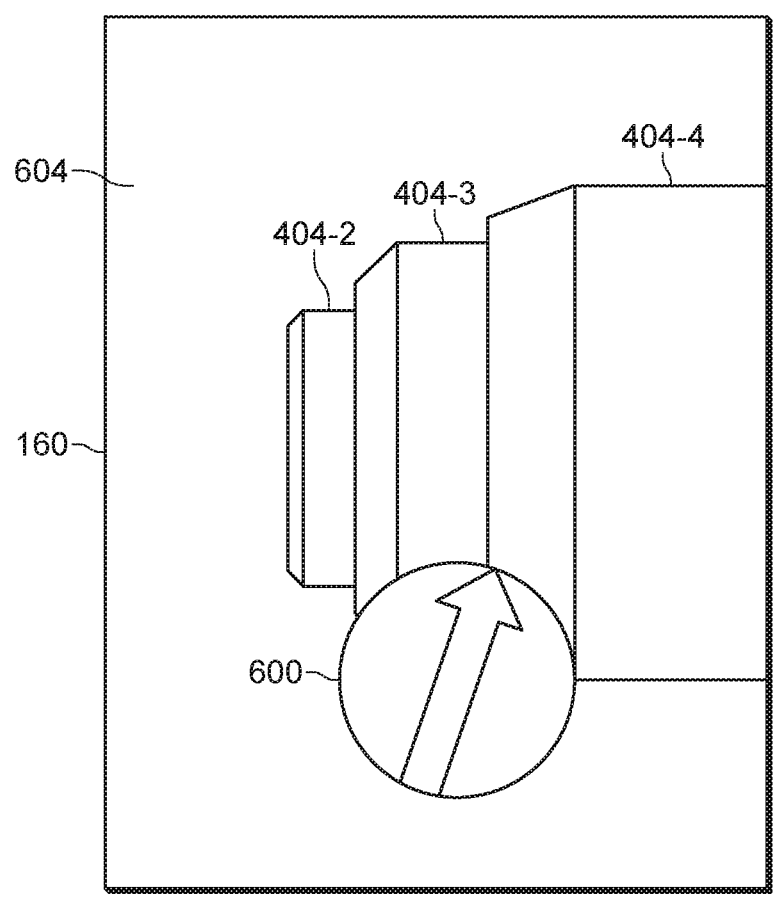
FIG. 6 depicts an anchor guide prompt generated at block 355 of the method of FIG. 3.

At block 355, the client device 105 is configured to present an anchor guide prompt, e.g. on the display 160 (although guide prompts can also be presented via other output devices, such as audible prompts via a speaker). The guide prompt presented at block 355 indicates the direction and optionally the distance from the current global position of the client device 105 to the global position of the anchor definition received at block 350. Referring briefly to FIG. 5B, a current position 536-1 of the client device 105 is illustrated. Turning to FIG. 6, an anchor guide prompt 600 is shown as presented on the display 160 of the client device 105. In particular the client device 105 presents not only the anchor guide prompt 600, but also the sequence of images whose capture was initiated at block 350. Thus, the display 160 also presents an image 604 from the sequence of images, depicting the current field of view of the camera 158. As will now be apparent, the anchor guide prompt 600 indicates the direction of travel required to arrive at the anchor position 408 (which is adjacent to the endcap of the row 404).

At block 360, the client device 105 is configured to determine whether the feature set of the anchor definition received at block 350 has been detected in one or more of the sequence of images captured using the camera 158. That is, the client device 105 is configured, for each of the sequence of images, to identify candidate features such as planes, lines, points and the like, and to determine whether the candidate features identified match any of the features in the feature set of the anchor definition received at block 350.

Figure 7A:
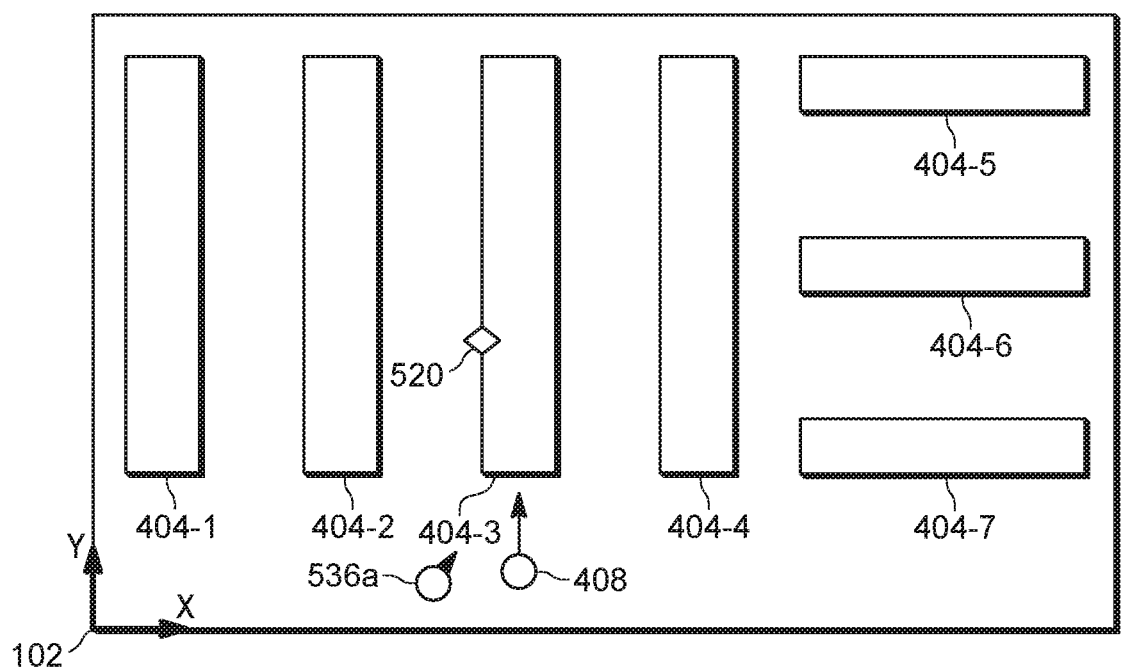
FIG. 7A depicts an overhead view of the facility of FIG. 4 during the performance of the method of FIG. 3.
Figure 7B:
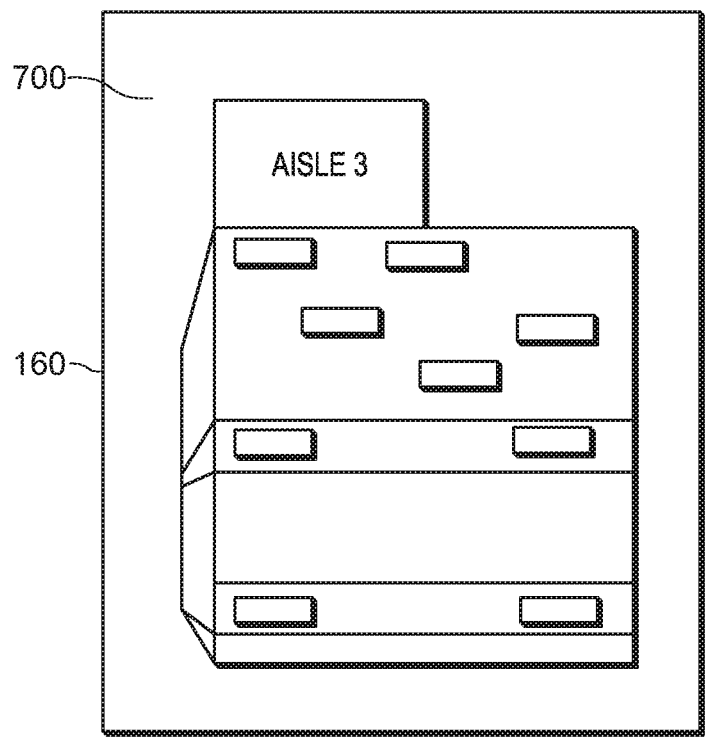
FIG. 7B depicts image data captured by the client device.

In the present example performance of the method 300, it is assumed that the features 428-1, 428-2 and 428-3 as shown in FIG. 4B are not detected in the image 604 presented in FIG. 6. The client device 105 therefore returns to block 355, and continues presenting the anchor guide prompt 600, updating the orientation of the anchor guide prompt according to the global position of the client device 105 relative to the global anchor position 408. Turning to FIG. 7A, an updated position 536a of the client device 105 is shown adjacent to the endcap of the row 404-3. FIG. 7B illustrates an image 700 in the sequence of images whose capture was initiated at block 350. As will be apparent from FIG. 7B, the features 428 of the anchor definition are detectable in the image 700. The determination at block 360 is therefore affirmative. Further, distortions between the features 428 as represented in the image 700 and the features 428 as defined in the anchor definition shown in FIG. 4B enable the client device 105 to determine the position of the client device 105 relative the anchor position 408.

In other words, detection of the anchor at block 360 causes the client device 105 to initiate a local navigation mode at block 365, in which the client device 105 is configured to determine and update a local device position relative to the anchor position 408. The device may continue to update the global location mentioned above in connection with block 320, but the remaining blocks of the method 300 are performed by the client device based on the local device position, which may be subject to reduced errors (e.g. errors incurred due to drift in the motion sensor 164) in comparison to the global location of the client device 105. The local navigational mode includes the use of not only the motion sensor 164 and communications interface 162 (for detecting wireless access point signatures), but also of the camera 158 and in particular the sequence of images whose capture was initiated at block 350. Specifically, the client device 105 can be configured to detect transient features in a subset of the images (e.g. planes, lines, points and the like) and to track changes in positions of such transient features within the images so long as the transient features remain visible. The client device 105 is then configured, based on detected changes in position of the transient features between images in the sequence, to update the local device position.

Figure 8A:
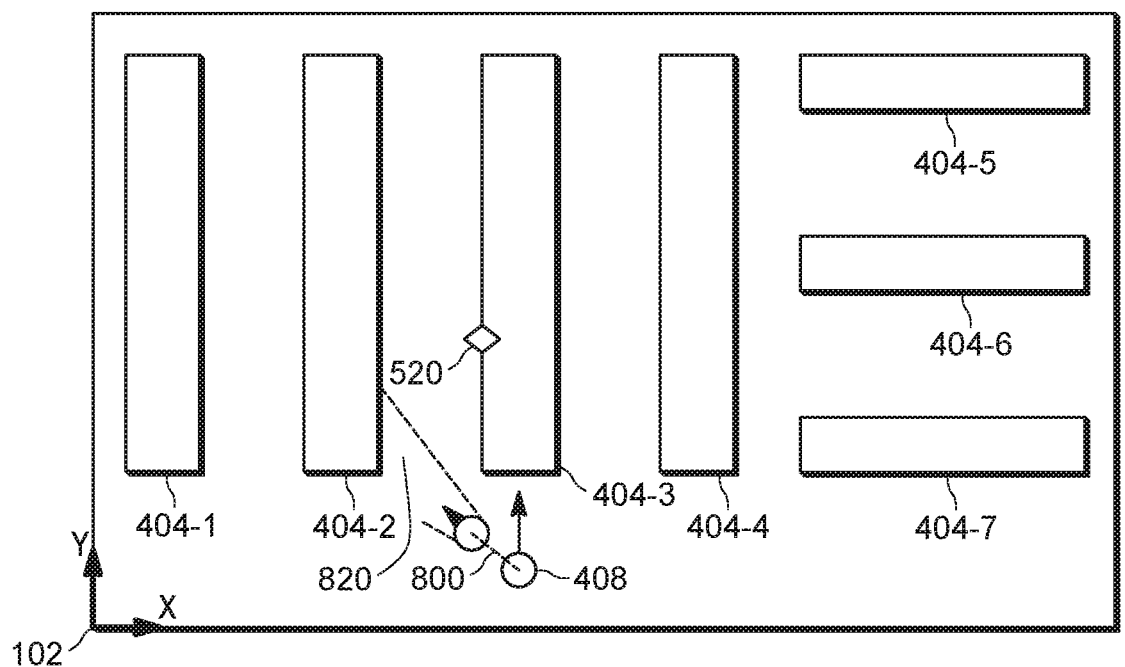
FIG. 8A depicts a further overhead view of the facility of FIG. 4 during the performance of the method of FIG. 3.
Figure 8B:
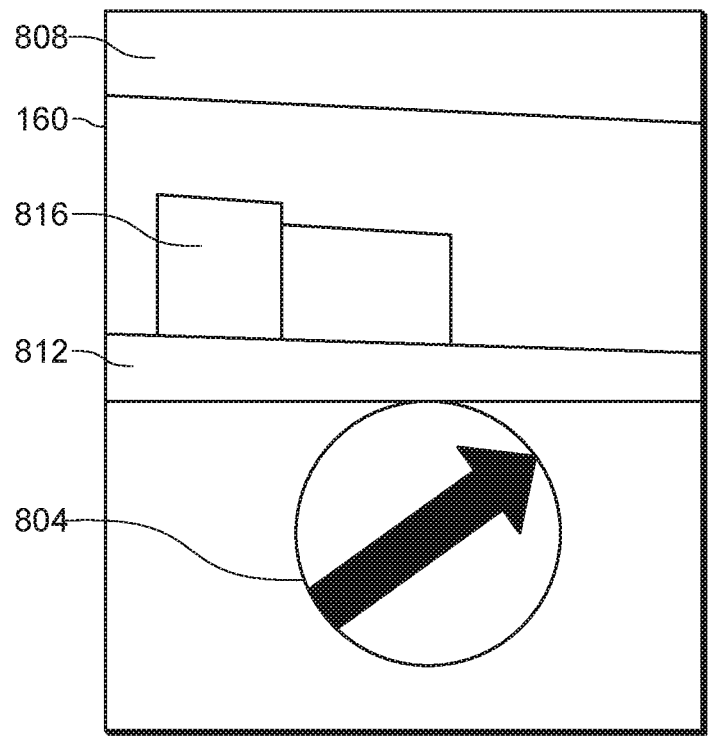
FIG. 8B depicts image data captured by the client device.

FIG. 8A illustrates a further overhead view of the facility 400, following travel of the client device 105 to a further position 536b. The client device 105 is configured to maintain an updated local device position 800 relative to the anchor position 408 (e.g. employing the anchor position 408 as the origin of a local frame of reference). At block 370 the client device 105 is configured to present a task guide prompt, indicating a direction of travel and optionally a distance to the task position, determined according to the task position specified in the task definition and the local device position 800. FIG. 8B illustrates a task guide prompt 804 presented on the display 160 along with an image 808 of the above-mentioned sequence. Also shown in FIG. 8B are examples of the transient features noted above, employed for local navigation. In particular, a shelf edge 812 and a product 816 may be identified by the client device 105 in the image 808 as well as a subsequent image. Based on changes in the positions of the shelf edge 812 and the product 816 between images, the client device 105 can determine an updated local position.

Referring again to FIG. 3, at block 375 the client device 105 is configured to determine whether the task position is within a field of view of the client device 105. The determination at block 375 is made based on the task position (which is a local position, defined relative to the anchor position 408) and the local device position, as well as on a field of view definition stored in the memory 152. An example field of view 820 is shown in FIG. 8A, and may correspond to the field of view of the camera 158. As is evident from FIG. 8A, the task position 520 is not within the field of view 820, and the determination at block 375 is therefore negative. Following a negative determination at block 375, the client device 105 is configured to return to block 370 to update the task guide prompt based on the current local device position. Block 375 is then repeated.

Figure 9A:
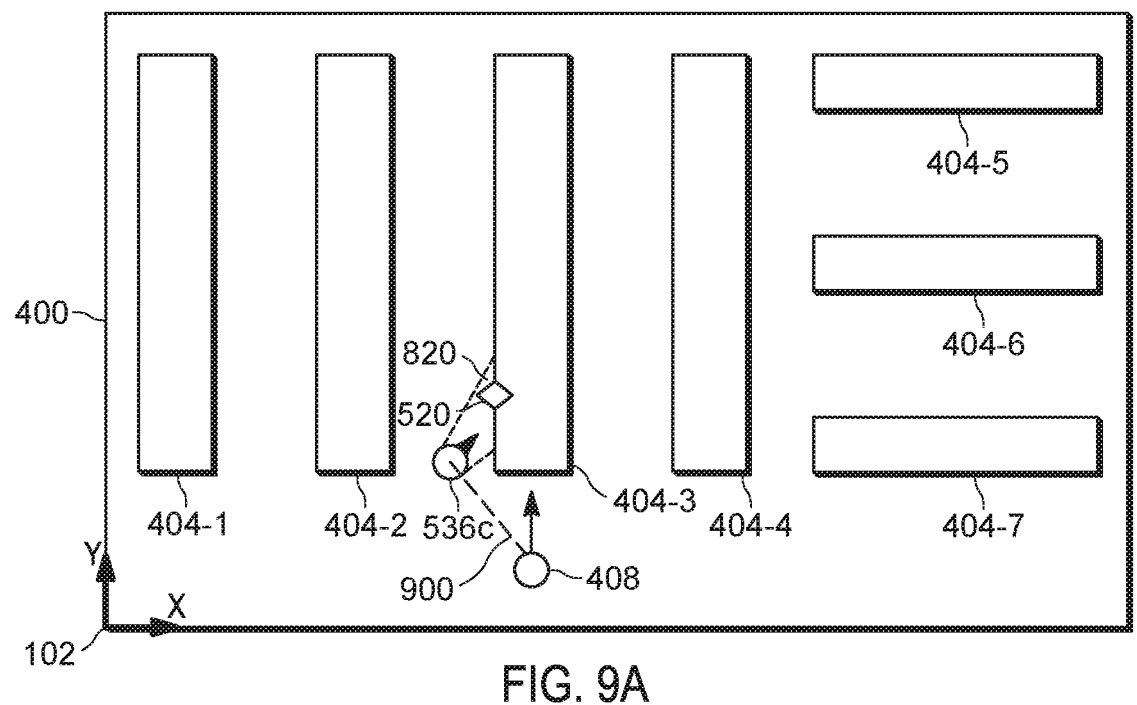
FIG. 9A depicts a further overhead view of the facility of FIG. 4 during the performance of the method of FIG. 3.

When the determination at block 375 is affirmative, the performance of the method 300 proceeds to block 380. Turning to FIG. 9A, a further overhead view of the facility 400 is shown, in which the client device 105 has advanced further into the aisle containing the task 520, to a position 536c, tracked at the client device 105 as a local device position 900. The client device 105 has also been reoriented towards the row 404-3 of shelves, and the determination at block 375 is affirmative (the task position 520 falls within the field of view 820). At block 380, therefore, the client device 105 is configured to present the task overlay data on the display 160 along with the above-mentioned sequence of images. In other words, the task overlay data is presented on the display as an augmented reality overlay (i.e. a virtual object) on the stream of images captured by the camera 158.

Figure 9B:
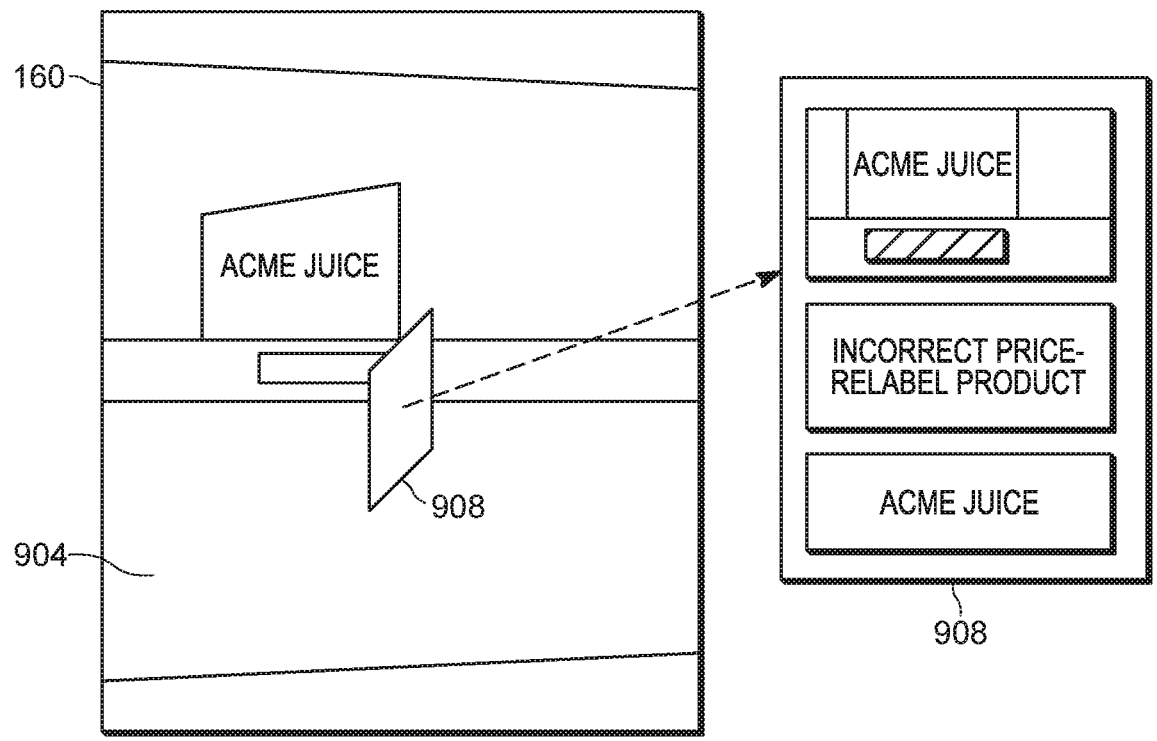
FIG. 9B depicts the presentation of task overlay information responsive to arrival of the client device at the position shown in FIG. 9A.

FIG. 9B illustrates a performance of block 380, with the client device 105 at the position 536c shown in FIG. 8A. In particular, an image 904 from the sequence initiated at block 350 is presented on the display 160, along with a virtual object overlay 908 containing the task overlay data 500 discussed earlier in connection with FIG. 5A. The performance of the method 300 thus enables the client device 105 to aid an operator of the client device 105 in locating a task position within the facility, and in performing the corresponding task.

Variations to the above systems and methods are contemplated. For example, in some embodiments the local device position mentioned above in connection with block 365 can be presented, e.g. on the display 160 of the client device 105, even in the absence of a task definition. For example, the device 160 can be configured, following detection of an anchor such as the aisle endcap shown in FIG. 7B, to present a map of the facility, or a portion thereof (e.g. a map of the corresponding aisle). Overlaid on the map, the device 105 can be configured to present an indication of the location of the device 105, as determined at block 365.

As mentioned previously, task definitions obtained by the server 101 at block 310 can be received from the client device 105. In particular, in some embodiments the client device 105 is configured to update a global location as at block 320, and to receive anchor definitions as discussed above in connection with block 350. However, the client device 105 need not receive task definitions. Instead, having detected an anchor at block 360, such as an endcap of an aisle (e.g. as shown in FIG. 7B), the client device 105 is configured to initiate local navigation and to capture one or more barcodes or other indicia.

The indicia captured by the client device 105 correspond to labels on the shelves 110 at which one or more tasks are required (e.g. to restock a product, correct a price on the label, or the like). The client device 105 is configured to determine a location of each scanned indicium based on the local navigation and the global location of the client device 105 itself, as well as on the location of the indicium relative to the client device 105. For example, the relative location of the indicium can be determined from an image of the indicium based on calibration parameters of the camera 158 along with dimensions of the indicium within the image.

Having located the scanned indicium in the facility (i.e. relative to the frame of reference 102), the client device 105 can be configured to receive input data defining task overlay data, such as an indication of the type of task to be performed (e.g. restock). The location of the indicium corresponds to the above-mentioned task position, and is transmitted along with the task overlay data to the server 101 for storage as a task definition.

In further embodiments, as noted earlier, the server 101 can be configured to perform certain blocks shown in FIG. 3 as being performed by the client device 105, and/or the client device 105 can be configured to perform certain blocks shown in FIG. 3 as being performed by the server 101. For example, in another embodiment the server 101 can be configured to determine a location of the client device 105 at block 320. Blocks 325, 330 and 335 can therefore be omitted. The server 101 can also be configured to receive image data captured by the client device 105 and detect anchors therein. In other words, rather than sending task and anchor definitions to the client device 105 at block 345, the server 101 is configured to select the task and anchor definitions, and the client device 105 is configured to capture and send images to the server 101 at block 350. The server 101, in turn, is configured to generate and send an anchor guide prompt to the client device 105 for presentation at block 355, and to perform the determination at block 360. The server 101 can be further configured to perform the processing associated with local navigation at block 365, and to generate and send the task guide prompt to the client device 105 for presentation at block 370. Still further, the server 101 can be configured to perform the determination at block 375 (based on captured images received from the client device 105) and to generate and send the task overlay for presentation by the client device 105 at block 380.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of navigational assistance at a mobile computing device for deployment in a facility having a global frame of reference, the method comprising:
   receiving an anchor definition containing (i) an anchor position in the global frame of reference, and (ii) a feature set corresponding to physical characteristics of the facility at the anchor position;
   receiving a task definition containing (i) a task position defined relative to the anchor position, and (ii) task overlay data;
   capturing, using an image capture module, a sequence of images;
   responsive to detecting the feature set in the sequence of images, determining a local device position of the mobile computing device relative to the anchor position;
   based on the local device position and the task position, determining whether the task position is within a field of view of the mobile computing device;
   responsive to determining that the task position is within the field of view, presenting the sequence of images overlaid with the task overlay data on a display;
   determining a global device position of the mobile computing device; and
   responsive to determining that the sequence of images does not contain the feature set, presenting an anchor guide prompt on the display indicating the anchor position relative to the global device position.

2. The method of claim 1, further comprising:
   prior to receiving the anchor definition and the task definition, determining the global device position of the mobile computing device and sending the global device position to a server; and
   receiving the anchor definition and the task definition responsive to sending the global device position.

3. The method of claim 1, wherein determining the local device position comprises:
   identifying transient features in the sequence of images and tracking the local device position based on movement of the transient features between images in the sequence.

4. The method of claim 1, wherein the feature set corresponds to (i) a visual appearance of physical structures in the facility and (ii) a proximity indicator corresponding to the proximity of the anchor position to a wireless transmitter; and wherein the method further comprises:
   capturing simultaneously with the sequence of images, using at least one of the image capture module and a communications interface, proximity signatures;
   wherein detecting the feature set includes (i) detecting the visual appearance in the sequence of images, and (ii) detecting the proximity indicator in the proximity signatures.

5. The method of claim 4, wherein the proximity indicator includes at least one of:
   a received signal strength indicator (RSSI) corresponding to a wireless access point;
   a round trip time (RTT) corresponding to the wireless access point;
   an identifier of a wireless beacon; and
   an identifier of a visual light communication (VLC) emitter.

6. The method of claim 1, wherein presenting the sequence of images and the overlay data includes selecting a portion of the image corresponding to the task location, and presenting the overlay data on the selected portion.

7. The method of claim 1, further comprising:
   responsive to determining that the task position is not within the field of view, presenting a task guide prompt on the display indicating the task position relative to the local device position.

8. The method of claim 1, wherein the overlay data includes at least one of a task descriptor and an object identifier.

9. A mobile computing device for navigational assistance in a facility having a global frame of reference, the mobile computing device comprising:
   a memory storing:
     an anchor definition containing (i) an anchor position in the global frame of reference, and (ii) a feature set corresponding to physical characteristics of the facility at the anchor position; and
     a task definition containing (i) a task position defined relative to the anchor position, and (ii) task overlay data;
   a display;
   an image capture module configured to capture a sequence of images;
   a processor connected to the memory, the display and the image capture module, the processor configured to:
     responsive to detecting the feature set in the sequence of images, determine a local device position of the mobile computing device relative to the anchor position;

based on the local device position and the task position,
determine whether the task position is within a field of view of the mobile computing device; and
responsive to determining that the task position is within the field of view, control the display to present the sequence of images overlaid with the task overlay data on a display,
wherein the mobile computing device further comprises a motion sensor configured to generate motion data and the processor is further configured to:
determine a global device position of the mobile computing device based on the motion data, and
responsive to determining that the sequence of images does not contain the feature set, to present an anchor guide prompt on the display indicating the anchor position relative to the global device position.

10. The mobile computing device of claim 9,
wherein the processor is further configured, prior to receiving the anchor definition and the task definition for storage in the memory, to determine a global device position of the mobile computing device based on the motion data and to send the global device position to a server via a communications interface.

11. The mobile computing device of claim 9, wherein the processor is further configured to determine the local device position by identifying transient features in the sequence of images and tracking the local device position based on movement of the transient features between images in the sequence.

12. The mobile computing device of claim 9, further comprising a communications interface; wherein the feature set corresponds to (i) a visual appearance of physical structures in the facility and (ii) a proximity indicator corresponding to the proximity of the anchor position to a wireless transmitter;
wherein the processor is further configured to control at least one of the image capture module and the communication interface to capture, simultaneously with the sequence of images, proximity signatures; and
wherein the processor is further configured, to detect the feature set, to (i) detect the visual appearance in the sequence of images, and (ii) detect the proximity indicator in the proximity signatures.

13. The mobile computing device of claim 12, wherein the proximity indicator includes at least one of:
a received signal strength indicator (RSSI) corresponding to a wireless access point;
a round trip time (RTT) corresponding to the wireless access point;
an identifier of a wireless beacon; and
an identifier of a visual light communication (VLC) emitter.

14. The mobile computing device of claim 9, wherein the processor is further configured to present the sequence of images and the overlay data by selecting a portion of the image corresponding to the task location; the processor further configured to present the overlay data on the selected portion.

15. The mobile computing device of claim 9, wherein the processor is further configured, responsive to determining that the task position is not within the field of view, to present a task guide prompt on the display indicating the task position relative to the local device position.

16. The mobile computing device of claim 9, wherein the overlay data includes at least one of a task descriptor and an object identifier.

* * * * *